United States Patent
Luo et al.

(10) Patent No.: US 8,229,424 B2
(45) Date of Patent: *Jul. 24, 2012

(54) NETWORK LISTENING METHOD OF A MOBILE PHONE

(75) Inventors: Wu Luo, Shenzhen (CN); Jun Tang, Shenzhen (CN); Zhi-Lu Yin, Shenzhen (CN)

(73) Assignees: Shenzhen Futaihong Precision Industry Co., Ltd., ShenZhen, Guangdong Province (CN); Chi Mei Communication Systems, Inc., Tu-Cheng, New Taipei (TW)

( * ) Notice: Subject to any disclaimer, the term of this patent is extended or adjusted under 35 U.S.C. 154(b) by 303 days.

This patent is subject to a terminal disclaimer.

(21) Appl. No.: 12/577,256

(22) Filed: Oct. 12, 2009

(65) Prior Publication Data

US 2010/0234012 A1  Sep. 16, 2010

(30) Foreign Application Priority Data

Mar. 13, 2009 (CN) .......................... 2009 1 0300842

(51) Int. Cl.
*H04W 4/00* (2009.01)
(52) U.S. Cl. .................. 455/434; 455/435.2; 455/552.1; 455/553.1; 370/328; 370/329
(58) Field of Classification Search .... 455/432.1–432.3, 455/434, 435.1–435.3, 552.1, 553.1, 509; 370/328, 329, 342, 441
See application file for complete search history.

(56) References Cited

U.S. PATENT DOCUMENTS

| | | | |
|---|---|---|---|
| 2008/0020765 A1* | 1/2008 | Black et al. | 455/435.2 |
| 2009/0104939 A1* | 4/2009 | Lee | 455/558 |
| 2009/0131054 A1* | 5/2009 | Zhang | 455/436 |
| 2009/0149220 A1* | 6/2009 | Camilleri et al. | 455/558 |
| 2009/0186651 A1* | 7/2009 | You | 455/552.1 |
| 2009/0197638 A1* | 8/2009 | Park et al. | 455/553.1 |
| 2010/0128699 A1* | 5/2010 | Yang et al. | 370/335 |
| 2010/0279737 A1* | 11/2010 | Joppek et al. | 455/558 |

\* cited by examiner

*Primary Examiner* — Lester Kincaid
*Assistant Examiner* — Mehmood B Khan
(74) *Attorney, Agent, or Firm* — Altis Law Group, Inc.

(57) ABSTRACT

A network listening method of a mobile phone is provided. The mobile phone includes a code division multiple access (CDMA) chip and two user identity module (UIM) cards. The network listening method executes a first network listening method to listen to a communication network, if a listening frequency of the first UIM card equals a listening frequency of the second UIM card and the listening channel of first UIM card equals the listening channel of the second UIM card. The network listening method further executes a second network listening method to listen to the communication network, if the listening frequency of the first UIM card does not equal the listening frequency of the second UIM card and/or the listening channel of first UIM card does not equal the listening channel of second UIM card.

6 Claims, 5 Drawing Sheets

NETWORK LISTENING METHOD OF A MOBILE PHONE

BACKGROUND

1. Technical Field

Embodiments of the present disclosure relate generally to mobile phones and communication methods of the mobile phones, and more particularly to a network listening method of a mobile phone having a single code division multiple access (CDMA) chip and two user identity module (UIM) cards.

2. Description of Related Art

Generally, a UIM is a card used in a mobile phone, and is composed of a microprocessor and a memory chip. Information, such as telephone numbers and network numbers, are usually stored in the memory chip of the UIM card. Therefore, the mobile phone can be provided with a call service by mounting the UIM card 6 to another mobile phone which supports a UIM interface.

A mobile phone may include one or more CDMA chips, such as a single CDMA mobile phone or a dual CDMA mobile phone. However, the single CDMA mobile phone is not adapted for two UIM cards. To use a dual-mode function of a mobile phone, the mobile phone should include two CDMA chips to adapt for two UIM cards correspondingly. Therefore, the practicability of the dual-mode function of the CDMA mobile phone is reduced.

Accordingly, there is a need for a network listening method used in a mobile phone having a single CDMA chip and two UIM cards, so as to overcome the above-mentioned problems.

DETAILED DESCRIPTION

The invention is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
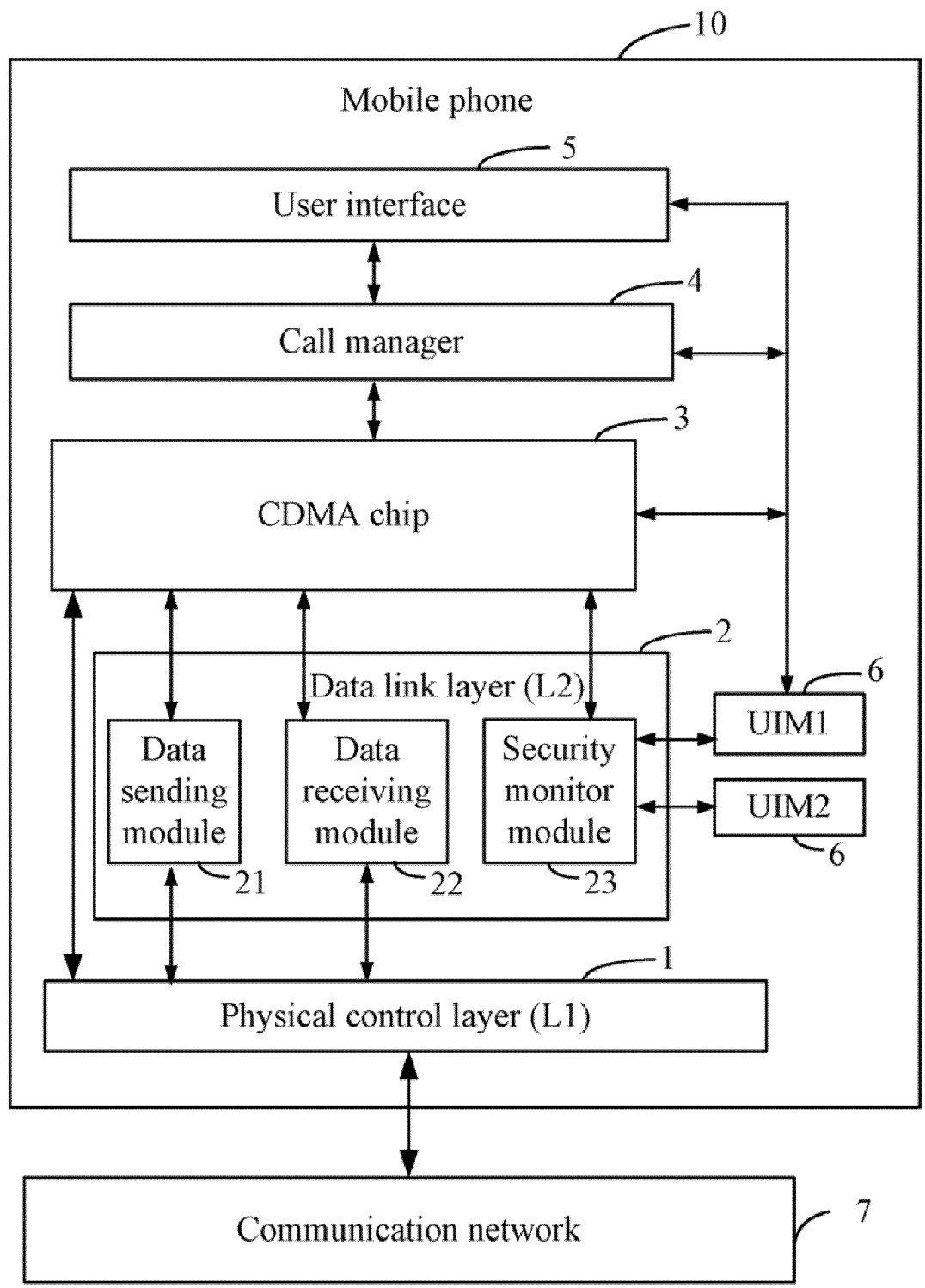
FIG. 1 is a schematic diagram of one embodiment of a mobile phone having a CDMA chip and two UIM cards.

FIG. 1 is a schematic diagram of one embodiment of a mobile phone 10. In one embodiment, the mobile phone 10 includes a code division multiple access (CDMA) chip 3, and two user identity module (UIM) cards 6 (i.e., a UIM1 card and a UIM2 card). Each of the UIM card 6 may be composed of a microprocessor and a memory chip. Information, such as telephone numbers and network numbers, may be stored in the memory chip of the UIM cards 6. The mobile phone 10 may further include a physical control layer (denoted as "L1") 1, a data link layer (denoted as "L2") 2, a call manager 4, and a user interface (UI) 5. The physical control layer 1 connects to the data link layer 2 and the CDMA chip 3, each of which can exchange communication data therein. The call manager 4 connects to the CDMA 3 and the user interface 4, and manages an incoming or outgoing call from each of the UIM cards 6.

The physical control layer 1 provides a physical interface for controlling the data link layer 2 to communicate with the CDMA chip 3. For example, if the mobile phone 10 receives a call from a communication network 7, the physical control layer 1 receives communication data (e.g., audio signals) from the communication network 7, and transfers the communication data to the CDMA chip 3. After the CDMA chip 3 processes the communication data, the physical control layer 1 transmits the processed data to the communication network 7.

The data link layer 2 may includes a data transmitting module 21, a data receiving module 22 and a security monitor module 23. Each of the function modules 21-23 may comprise one or more computerized operations executable by the CDMA chip 3 of the mobile phone 10. In general, the word "module," as used herein, refers to logic embodied in hardware or firmware, or to a collection of software instructions, written in a programming language, such as, for example, Java, C, or assembly. One or more software instructions in the modules may be embedded in firmware, such as an EPROM. The modules described herein may be implemented as either software and/or hardware modules and may be stored in any type of computer-readable medium or other storage device of the mobile phone 10. The data transmitting module 21 is operable to send the processed data to the communication network 7 via the physical control layer 1. The data receiving module 22 is operable to receive the communication data from the communication network 7 through the physical control layer 1. The security monitor module 23 connects to the two UIM cards 6 (i.e., the UIM1 card 6 and the UIM2 card 6), and authorizes user identification of the mobile phone 10 to log in the communication network 7.

The CDMA chip 3 is operable to process the communication data transmitted from the data link layer 2, and records network listening parameters in each of the UIM cards 6. In one embodiment, the network listening parameters may include a listening frequency, a listening channel, and a listening time when each of the UIM cards 6 listens to the communication network 7. For example, when the UIM1 card 6 listens to the communication network 7, the CDMA chip 3 records the listening frequency (e.g., 12000 Hz) to the UIM1 card 6, and the listening channel (e.g., No. 2 listening channel) to the UIM1 card 6. After the UIM1 card 6 logs in the communication network 7, the CDMA chip 3 calculates the listening time (e.g., 5 seconds) for the UIM1 card 6, and then records the listening time in the UIM1 card 6.

Figure 2:
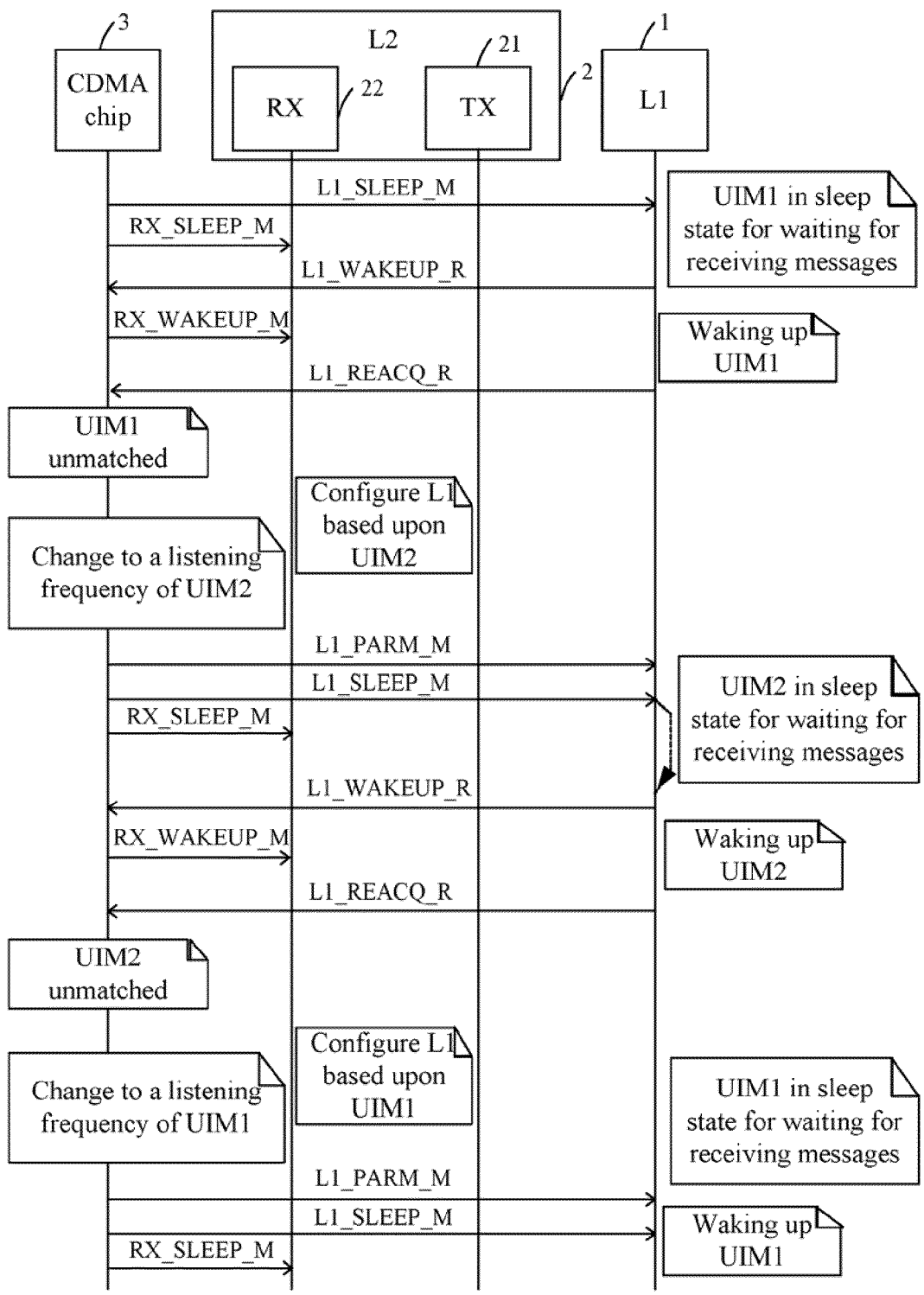
FIG. 2 is a schematic diagram illustrating a communication mode of the mobile phone of FIG. 1.

FIG. 2 is a schematic diagram illustrating a communication mode of the mobile phone 10. In the embodiment, "L1" represents the physical control layer 1, and "L2" represents the data link layer 2. "TX" represents the data transmitting module 21, and "RX" represents the data receiving module 22 of the data link layer 2.

In one embodiment with respect to FIG. 2, it is assumed that the mobile phone 10 initially adopts the UIM1 card 6 to listen to the communication network 7. The CDMA chip 3 sends a plurality of waking parameters to wake up the UIM1 card 6. The waking parameters may include L1_WAKEUP_R, L1_REACQ_R, RX_WAKEUP_M, for example. The UIM1 card 6 informs the CDMA chip 3 to receive messages from the communication network 7 through RX of L2 when the listening time arrives. When the UIM1 card 6 is not wakened up, the CDMA chip 3 determines whether a listening frequency of the mobile phone 10 matches the UIM2 card 6. If the listening frequency matches the UIM2 card 6, L1 sends the waking parameters to wake up the UIM2 card 6, and sends sleep parameters to control the UIM1 card 6 to be in a sleep state. The sleep parameters may include L1_SLEEP_M, and L1_REACQ_R, for example. After the UIM2 card 6 is wakened up, the UIM2 card 6 informs the CDMA chip 3 to receive messages from the communication network 7 through RX of L2 when the listening time arrives.

When the UIM2 card 6 is not wakened up, the CDMA chip 3 determines whether the listening frequency of the mobile phone 10 matches the UIM1 card 6. If the listening frequency matches the UIM1 card 6, L1 sends the waking parameters to wake up the UIM1 card 6, and sends sleep parameters to control the UIM2 card 6 to be in a sleep state. After the UIM1 card 6 is wakened up, the UIM1 card 6 informs the CDMA chip 3 to receive messages from the listening channel through RX of L2 when the listening time arrives.

Figure 3:
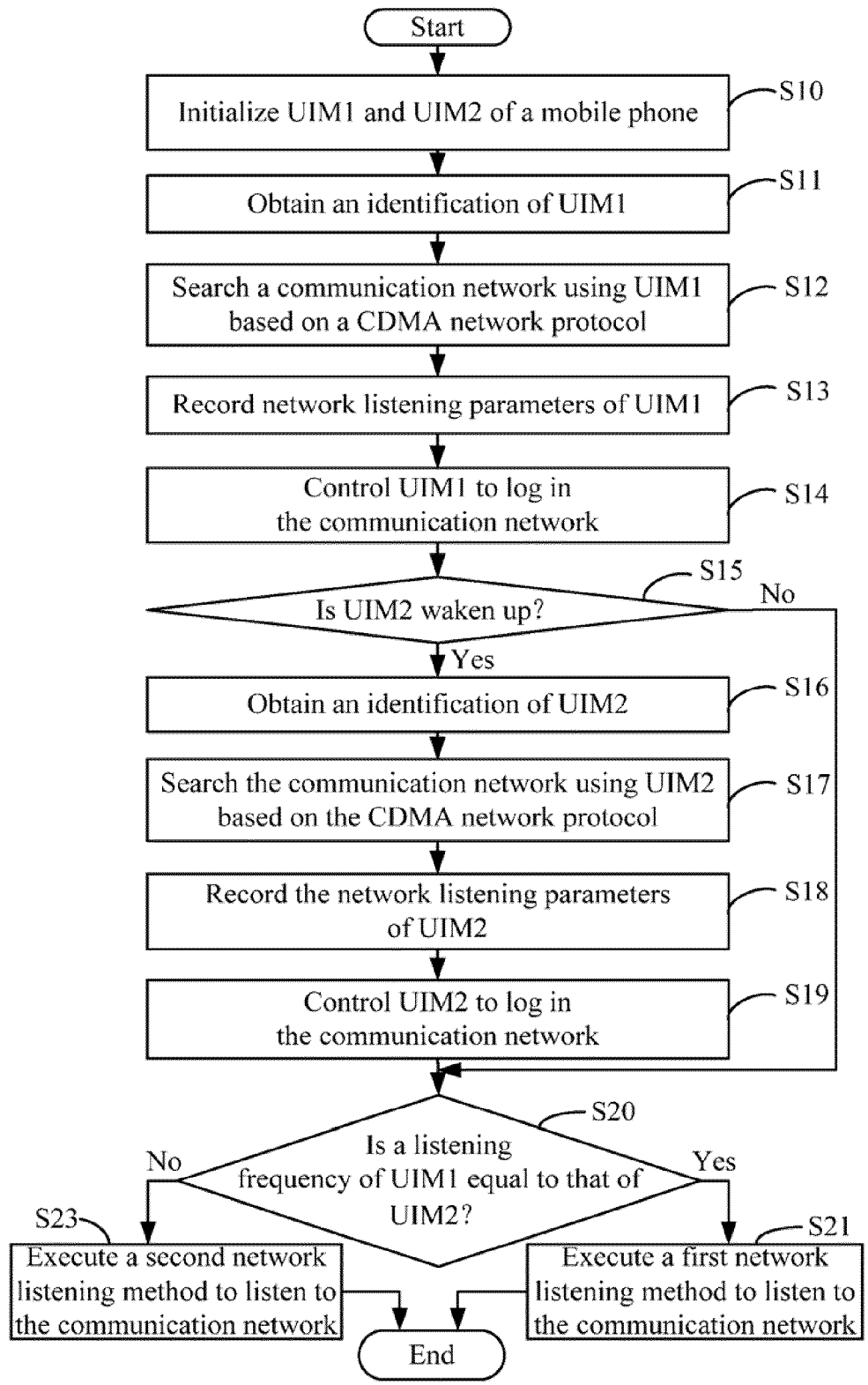
FIG. 3 is a flowchart of one embodiment of a network listening method by using the mobile phone of FIG. 1.

FIG. 3 is a flowchart of one embodiment of a network listening method by using the mobile phone 10, for example, that of FIG. 1. Depending on the embodiment, additional blocks may be added, others removed, and the ordering of blocks may be changed.

In block S10, the physical control layer 1 initializes the UIM1 card 6 and the UIM2 card 6 of the mobile phone 10. In block S11, the physical control layer 1 obtains an identification of the UIM1 card 6. In block S12, the physical control layer 1 searches the communication network 7 based on a CDMA network protocol by using the UIM1 card 6. In block S13, the CDMA chip 3 records network listening parameters of the UIM1 card 6. As mentioned above, the network listening parameters include a listening frequency, a listening channel, and a listening time when each of the UIM cards 6 listens to the communication network 7. In block S14, the CDMA chip 3 controls the UIM1 card 6 to log in the communication network 7 according to the network listening parameters of the UIM1 card 6.

In block S15, the CDMA chip 3 determines whether the UIM2 card 6 is in a waken state or in a sleep state. If the UIM2 card 6 is in a waken state, in block S16, the physical control layer 1 obtains an identification of the UIM2 card 6. Otherwise, if the UIM2 card 6 is in a sleep state, the procedure goes to block S20 as described below. In block S17, the physical control layer 1 searches the communication network 7 based on a CDMA network protocol using the UIM2 card 6. In block S18, the CDMA chip 3 records the network listening parameters of the UIM2 card 6. In block S19, the CDMA chip 3 controls the UIM2 card 6 to log in the communication network 7 according to the network listening parameters of the UIM2 card 6.

In block S20, the CDMA chip 3 determines whether the listening frequency of the UIM1 card 6 equals the listening frequency of the UIM2 card 6, and determines whether the listening channel of the UIM1 card 6 equals the listening channel of the UIM2 card 6. If the listening frequency of the UIM1 card 6 equals the listening frequency of the UIM2 card 6, and the listening channel of the UIM1 card 6 equals the listening channel of the UIM2 card 6, in block S21, the CDMA chip 3 executes a first network listening method to listen to the communication network 7. Details of the first network listening method are described as shown in FIG. 4 below.

Figure 5:
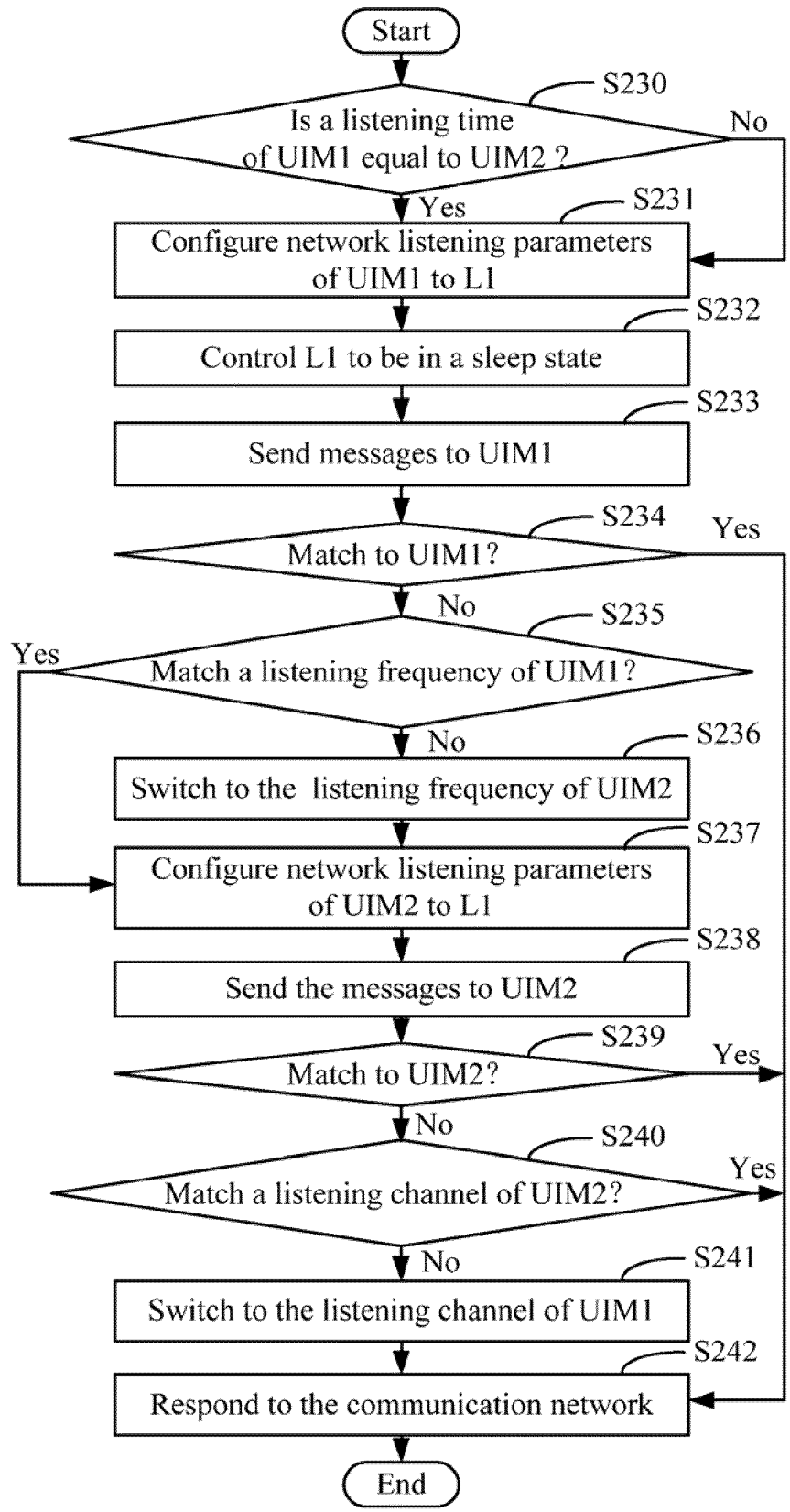
FIG. 5 is a flowchart of detailed descriptions of S23 in FIG. 3.

Otherwise, if the listening frequency of the UIM1 card 6 does not equal the listening frequency of the UIM2 card 6, and/or the listening channel of the UIM1 card 6 does not equal the listening channel of the UIM2 card 6, in block S23, the CDMA chip 3 executes a second network listening method to listen to the communication network 7. Details of the second network listening method are described as shown in FIG. 5 below.

Figure 4:
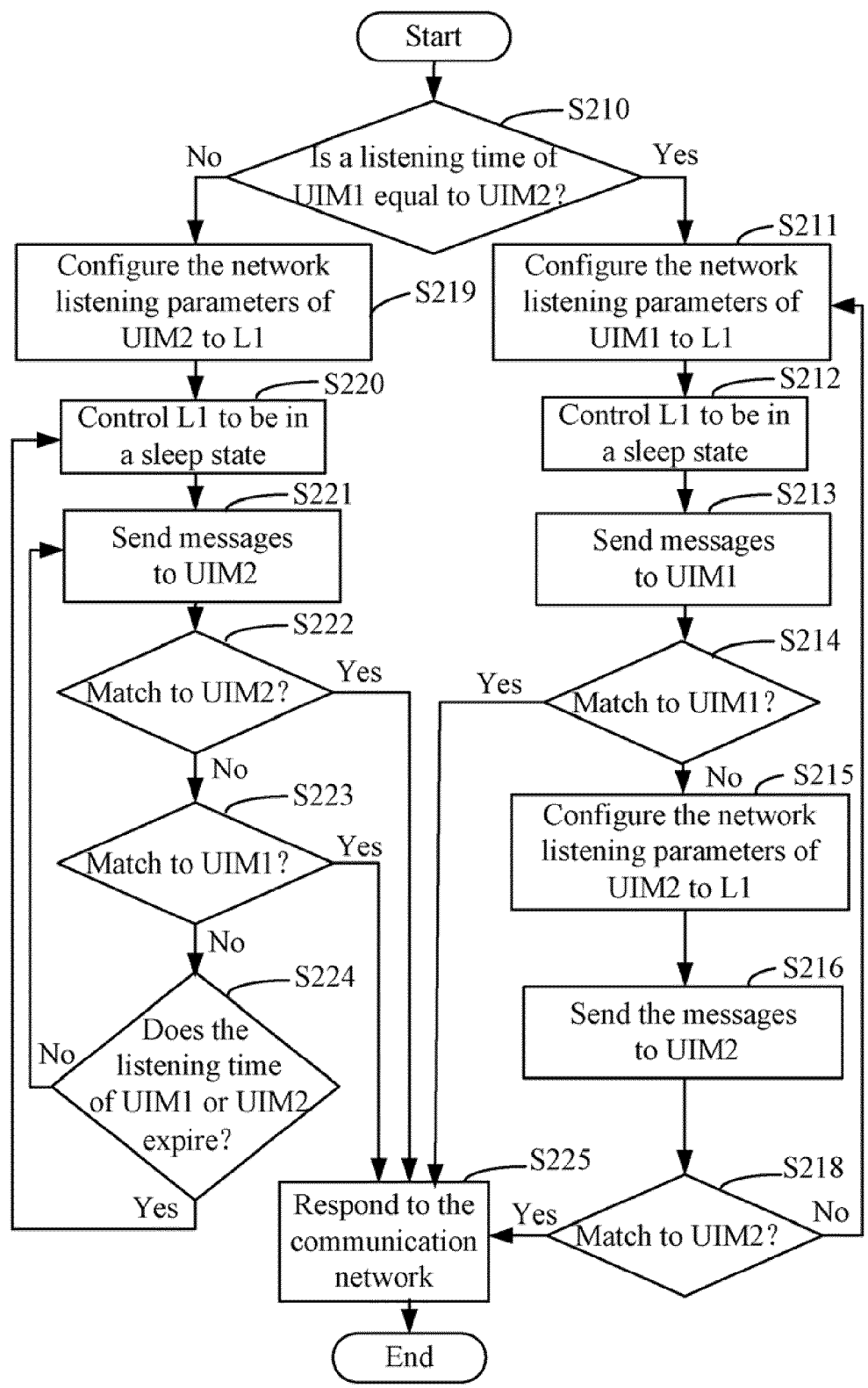
FIG. 4 is a flowchart of detailed descriptions of S21 in FIG. 3.

FIG. 4 is a flowchart of detailed descriptions of S21 in FIG. 3. Depending on the embodiment, additional blocks may be added, others removed, and the ordering of blocks may be changed.

In block S210, the CDMA chip 3 determines whether the listening time of the UIM1 card 6 equals the listening time of the UIM2 card 6. If the listening time of the UIM1 card 6 equals the listening time of the UIM2 card 6, the procedure goes to block S211 as described below. Otherwise, if listening time of the UIM1 card 6 does not equal the listening time of the UIM2 card 6, the procedure goes to block S219 as described below.

In block S211, the CDMA chip 3 configures the network listening parameters of the UIM1 card 6 to the physical control layer 1. In block S212, the CDMA chip 3 controls the physical control layer 1 to be in a sleep state to wait for messages from the communication network 7. In block S213, the physical control layer 1 sends the messages to the UIM1 card 6. In block S213, the CDMA chip 3 determines whether the messages match the UIM1 card 6 according to the listening parameters. If the messages match the UIM1 card 6, the procedure goes to block S225 as described below. Otherwise, if the messages do not match the UIM1 card 6, in block S215, the CDMA chip 3 configures the network listening parameters of the UIM2 card 6 to the physical control layer 1. In block S216, the physical control layer 1 sends the messages to the UIM2 card 6. In block S218, the CDMA chip 3 determines whether the messages match the UIM2 card 6 according to the listening parameters. If the messages match the UIM2 card 6, the procedure goes to block S225 as described below. Otherwise, if the messages do not match the UIM2 card 6, the procedure returns to block S211 as described above.

In block S219, the CDMA chip 3 configures the network listening parameters of the UIM2 card 6 to the physical control layer 1. In block S220, the CDMA chip 3 controls the physical control layer 1 to be in a sleep state to wait for messages from the communication network 7. In block S221, the physical control layer 1 sends the messages to the UIM2 card 6. In block S222, the CDMA chip 3 determines whether the messages match the UIM2 card 6 according to the listening parameters. If the messages match the UIM2 card 6, the procedure goes to block S225 as described below. Otherwise, if the messages do not match the UIM2 card 6, in block S223, the CDMA chip 3 determines whether the messages match the UIM1 card 6 according to the listening parameters. If the messages match the UIM1 card 6, the procedure goes to block S225 as described below. Otherwise, if the messages do not match the UIM1 card 6, in block S224, the CDMA chip 3 determines whether the listening time of the UIM1 card 6 and the UIM2 card 6 expire. If the listening time of the UIM1 card 6 and the UIM2 card 6 expire, the procedure returns to block S220 as described above. If one of the listening time of the UIM1 card 6 and the UIM2 card 6 does not expire, the procedure returns to block S221.

As described in block S216, S218, S222, and S223, if the messages match either the UIM1 card 6 or the UIM2 card 6, in block S225, the CDMA chip 3 responds to the communication network 7 by using the UIM1 card 6 or the UIM2 card 6.

FIG. 5 is a flowchart of detailed descriptions of S23 in FIG. 3. Depending on the embodiment, additional blocks may be added, others removed, and the ordering of blocks may be changed.

In block S230, the CDMA chip 3 determines whether the listening time of the UIM1 card 6 equals the listening time of the UIM2 card 6. If the listening time of the UIM1 card 6 equals the listening time of the UIM2 card 6, in block S231, the CDMA chip 3 configures the network listening parameters of the UIM1 card 6 to the physical control layer 1. Otherwise, if the listening time of the UIM1 card 6 does not equal the listening time of the UIM2 card 6, the procedure also goes to block S231 as described above.

In block S232, the CDMA chip 3 controls the physical control layer 1 to be in a sleep state receiving messages from the communication network 7. In block S233, the CDMA chip 3 sends the messages to the UIM1 card 6. In block S234, the CDMA chip 3 determines whether the messages match the UIM1 card 6 according to the listening parameters. If the messages match the UIM1 card 6, in block S242, the CDMA chip 3 responds to the communication network 7 by using the UIM1 card 6. Otherwise, if the messages do not match the UIM1 card 6, in block S235, the CDMA chip 3 determines whether the communication frequency equals the listening frequency of the UIM1 card 6. If the communication frequency does not equal the listening frequency of the UIM1 card 6, in block S236, the CDMA chip 3 switches the communication frequency to the listening frequency of the UIM2 card 6. Otherwise, if the communication frequency equals the listening frequency of the UIM1 card 6, the procedure goes to block S237 as described below.

In block S237, the CDMA chip 3 configures the network listening parameters of the UIM2 card 6 to the physical control layer 1. In block S238, the CDMA chip 3 sends the messages to the UIM2 card 6. In block S239, the CDMA chip 3 determines whether the messages match the UIM2 card 6 according to the listening parameters. If the messages match the UIM2 card 6, in block S242, the CDMA chip 3 responds to the communication network 7 by using the UIM2 card 6. Otherwise, if the messages do not match the UIM2 card 6, in block S240, the CDMA chip 3 determines whether the communication channel matches the listening channel of the UIM2 card 6.

If the communication channel does not match the listening channel of the UIM2 card 6, in block S241, the CDMA chip 3 switches the communication channel to the listening channel of the UIM1 card 6. Otherwise, if the communication channel matches the listening channel of the UIM2 card 6, in block S242, the CDMA chip 3 responds to the communication network 7 by using the UIM2 card 6.

As described in block S230, if the listening time of the UIM2 card 6 equals the listening time of the UIM2 card 6, the listening frequency and the listening channel of the UIM1 card 6 are switched to the listening frequency and the listening channel of the UIM2 card 6 in a period of the listening time. Otherwise, if the listening time of the UIM1 card 6 does not equal the listening time of the UIM2 card 6, the listening frequency and the listening channel of the UIM1 card 6 are switched to the listening frequency and the listening channel of the UIM2 card 6 in two periods of the listening time.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A network listening method of a mobile phone comprising a code division multiple access (CDMA) chip and a first user identity module (UIM) card and a second UIM card, the network listening method comprising:

obtaining an identification of the first UIM card using a physical control layer of the mobile phone;

searching a communication network based on a CDMA network protocol using the first UIM card;

recording network listening parameters of the first UIM card that comprise a listening frequency of the first UIM card, a listening channel of the first UIM card, and a listening time of the first UIM card;

controlling the first UIM card to log in the communication network according to the network listening parameters of the first UIM card;

obtaining an identification of the second UIM card using the physical control layer when the second UIM card is wakened up;

searching the communication network based on the CDMA network protocol using the second UIM card;

recording network listening parameters of the second UIM card that comprise a listening frequency of the second UIM card, a listening channel of the second UIM card, and a listening time of the second UIM card;

controlling the second UIM card to log in the communication network according to the network listening parameters of the second UIM card;

determining whether a listening frequency of the first UIM card equals a listening frequency of the second UIM card, and whether a listening channel of the first UIM card equals a listening channel of the second UIM card; and executing a first network listening method to listen to the communication network, when the listening frequency of the first UIM card equals the listening frequency of the second UIM card, and the listening channel of the first UIM card equals the listening channel of the second UIM card; or executing a second network listening method to listen to the communication network, when the listening frequency of the first UIM card does not equal the listening frequency of the second UIM card, and/or the listening channel of first UIM card does not equal the listening channel of second UIM card;

wherein the first network listening method comprises:

determining whether the listening time of the first UIM card equals the listening time of the second UIM card;

in response to the listening time of the first UIM card equaling the listening time of the second UIM card, executing the following blocks:

(a1) configuring the network listening parameters of the first UIM card to the physical control layer;

(a2) controlling the physical control layer to be in a sleep state to wait for messages from the communication network;

(a3) sending messages to the first UIM card, and determining whether the messages match the first UIM card according to the listening parameters;

(a4) responding to the communication network using the first UIM card when the messages match the first UIM card, or configuring the network listening parameters of the second UIM card to the physical control layer when the messages do not match the first UIM card;

(a5) sending the messages to the second UIM card, and determining whether the messages match the second UIM card according to the listening parameters; and (a6) responding to the communication network using the second UIM card when the messages match the second UIM card, or repeating block (a1) to block (a5) when the messages do not match the second UIM card.

2. The network listening method according to claim 1, further comprising:
  in response to the listening time of the first UIM card not equaling the listening time of the second UIM card, executing the following blocks:
  (b1) configuring the network listening parameters of the second UIM card to the physical control layer;
  (b2) controlling the physical control layer to be in a sleep state to wait for messages from the communication network;
  (b3) sending messages to the second UIM card, and determining whether the messages match the second UIM card according to the listening parameters;
  (b4) responding to the communication network using the second UIM card if the messages match the second UIM card, or determining whether the messages match the first UIM card according to the listening parameters if the messages do not match the second UIM card;
  (b5) responding to the communication network using the first UIM card if the messages match the first UIM card, or determining whether the listening time of the first UIM card and the second UIM card expires if the messages do not match the first UIM card; and
  (b6) repeating block (b2) to block (b5) if the listening time of the first UIM card and the second UIM card expires, or repeating block (b3) to block (b5) if the listening time of the first UIM card and the second UIM card does not expire.

3. The network listening method according to claim 1, wherein the second network listening method comprises:
  (S1) determining whether the listening time of the first UIM card equals the listening time of the second UIM card;
  (S2) configuring the network listening parameters of the first UIM card to the physical control layer if the listening time of the first UIM card equals the listening time of the second UIM card;
  (S3) controlling the physical control layer to be in a sleep state to wait for messages from the communication network;
  (S4) sending messages to the first UIM card, and determining whether the messages match the first UIM card according to the listening parameters;
  (S5) responding to the communication network using the first UIM card if the messages match the first UIM card, or determining whether a communication frequency of the communication network equals the listening frequency of the first UIM card if the messages do not match the first UIM card;
  (S6) switching the communication frequency to the listening frequency of the second UIM card if the communication frequency does not equal the listening frequency of the first UIM card, or configuring the network listening parameters of the second UIM card to the physical control layer if the communication frequency equals the listening frequency of the first UIM card;
  (S7) sending messages to the second UIM card, and determining whether the messages match the second UIM card according to the listening parameters;
  (S8) responding to the communication network using the second UIM card if the messages match the second UIM card, or determining whether the communication channel matches the listening channel of the second UIM card if the messages match the second UIM card; and
  (S9) responding to the communication network using the second UIM card if the communication channel matches the listening channel of the second UIM card, or switching the communication channel to the listening channel of the first UIM card and responding to the communication network using the first UIM card if the communication channel does not match the listening channel of the second UIM card.

4. The network listening method according to claim 3, wherein the listening frequency and the listening channel of the first UIM card are switched to the listening frequency and the listening channel of the second UIM card in a period of the listening time of the first UIM card, if the listening time of the first UIM card equals the listening time of the second UIM card.

5. The network listening method according to claim 3, further comprising:
  executing the block (S2) to the block (S9) if the listening time of the first UIM card does not equal the listening time of the second UIM card.

6. The network listening method according to claim 5, wherein the listening frequency and the listening channel of the first UIM card are switched to the listening frequency and the listening channel of the second UIM card in two periods of the listening time of the first UIM card, if the listening time of the first UIM card doe not equal the listening time of the second UIM card.

* * * * *